D. B. Waite.
Mower.

Nº 20457.  Patented Jun. 1, 1858.

UNITED STATES PATENT OFFICE.

D. B. WAITE, OF SPRINGWATER, NEW YORK.

IMPROVEMENT IN HARVESTERS.

Specification forming part of Letters Patent No. 20,457, dated June 1, 1858.

*To all whom it may concern:*

Be it known that I, D. B. WAITE, of Springwater, in the county of Livingston and State of New York, have invented certain new and useful Improvements in Grain and Grass Harvesters; and I do hereby declare that the following is a full, clear, and exact description of the same, reference being had to the annexed drawings, making a part of this specification, in which—

Figure 1:
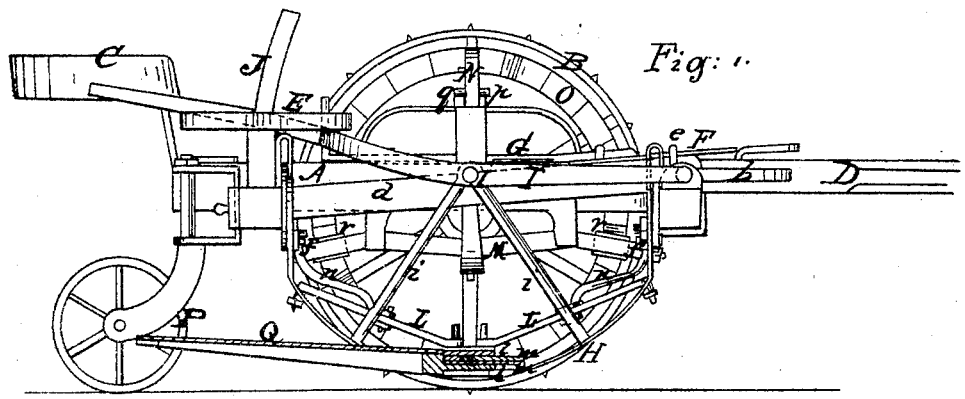
Figure 3:
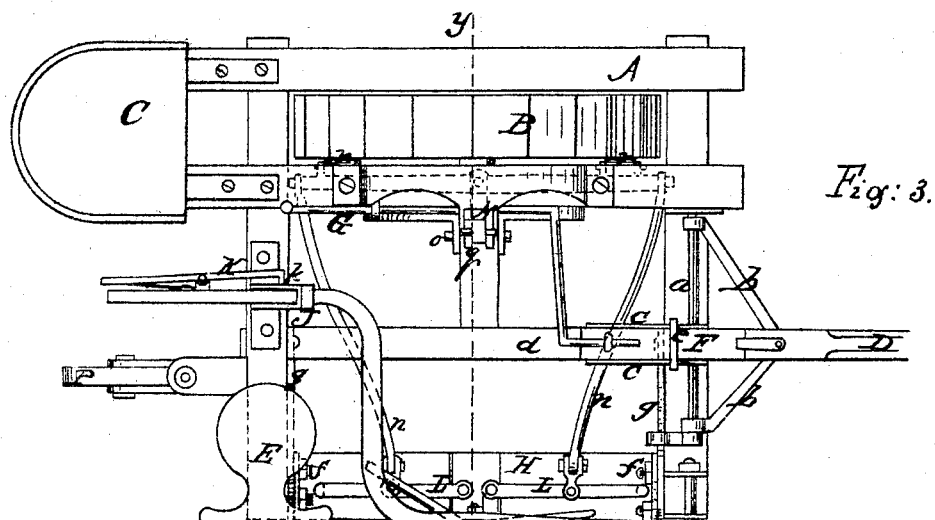
Figure 2:
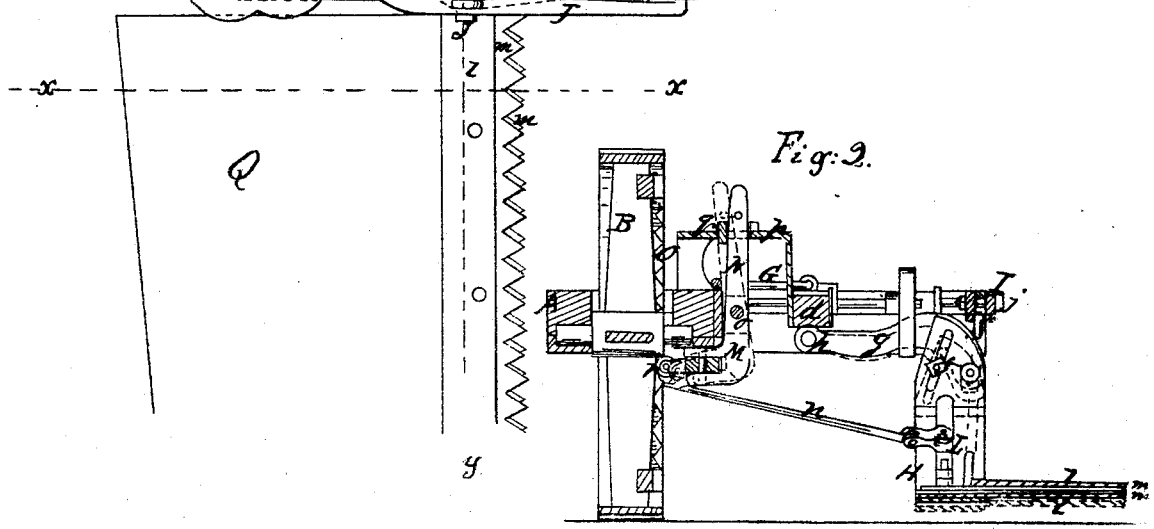

Figure 1 is a side sectional elevation of a harvester constructed according to my invention. $x\ x$, Fig. 3, indicates the plane of section. Fig. 2 is a vertical section of the same, taken in the line $y\ y$, Fig. 3. Fig. 3 is a plan or top view of the same.

Similar letters of reference indicate corresponding parts in the several figures.

This invention consists in a novel arrangement of means for operating the cutting device, and an arrangement of parts for raising and lowering the same; also, in a peculiar arrangement of parts whereby the device by which the cutting device is operated may be readily thrown in and out of gear.

The invention further consists in a peculiar means employed for regulating or controlling the draft-pole as regards its vertical movement or position.

To enable those skilled in the art to fully understand and construct my invention, I will proceed to describe it.

A represents the main frame of the machine, in which the driving-wheel B is placed. This frame is of quadrilateral form, having the driver's seat C at its back part and the draft-pole D attached to its front end. The raker's or attendant's seat E is also attached to the back part of the frame A. The draft-pole D is attached to the frame A by means of a rod or bolt, $a$, which passes through the ends of hounds $b\ b$, and through the end of the pole, the hounds and pole being allowed to turn freely on the rod or bolt.

F is a metal plate, which is fitted between guides $c\ c$, attached to the sides of a bar, $d$, of the main frame, said plate being also fitted in a guide, $e$. The plate F is allowed to move freely back and forth between the guides $c\ c$, and a rod, G, is attached to it, said rod being so bent or curved that it may extend back to the driver's seat C, as shown clearly in Fig. 3. The plate F is placed on the front end of the bar $d$, and by actuating the rod G may be moved a greater or less distance over the inner end of the draft-pole, so as to regulate the distance of its vertical movement on the rod or bolt $a$, and thereby determine to a certain extent the height of the cutting device from the surface of the ground.

H represents a curved bar the ends of which are slotted longitudinally for a short distance, and through which slots bolts $f$, which are attached to the frame A, pass. The extreme ends of the curved bar H are pivoted to the outer ends of levers $g\ g$, the inner ends of which are pivoted to the frame A, as shown at $h$, (see Fig. 2,) in which one lever, $g$, is shown.

To the upper surface of the curved bar H two inclined rods, $i\ i$, are attached, and the upper ends of these rods are united and form a support for a lever, I, through which and the upper end of said support a fulcrum-pin, $j$, passes. The lever I is of curved form, so that its back end may be within a short distance of the seat C. The back part of lever I works within a guide, J, attached to the frame A, and a lever, K, is attached to the lever I, the lever K having a pin, $k$, attached to it, which passes through either of a series of holes in the guide J and below the lever I, retaining said lever in the desired position.

To the center of the bar H two bars, $l\ l$, are attached, and between these bars $l\ l$ two sickles, $m\ m$, are placed, one over the other, said sickles having the usual saw-shaped teeth. The sickles are allowed to work freely between the bars $l\ l$, and their inner ends are attached to levers L L, the outer ends of which are secured to the curved bar H. The levers L L are connected by rods $n\ n$ to the ends of a lever, M, the center of which is pivoted to the lower end of a vertical bar, N, which is secured by a bolt $o$ to the frame A. The upper end of the bar N passes through a slotted plate, $p$, attached to the frame, and it is secured in proper position by a wedge or key, $q$. (See more particularly Fig. 2.)

Near each end of the lever M a friction-roller, $r$, is attached, and these rollers bear against the face of an annular serpentine cam, O, which is attached concentrically to the wheel B.

The back end of the frame A is supported by a caster-wheel, P, and the outer ends of the bars $l\ l$ are supported by a wheel. When the machine is used as a grain-harvester a platform, Q, is attached to the bars $l\ l$.

By adjusting the back end of the lever I the bar H, and consequently the sickles $m\ m$, may be raised and lowered and retained at any desired height by securing the back end of lever I at the proper point by means of the pin $k$ of lever K. As the machine is drawn along the cam O oscillates or vibrates the lever M, and the sickles $m\ m$ are operated back and forth simultaneously in opposite directions from said lever M by means of the connecting-rods $n\ n$ and levers L L. The driving device may be thrown out of gear at any time with the driving-wheel B by reversing the key $q$ and shoving inward the upper end of bar N, as shown in red, Fig. 2; and the sickles may be secured the desired height by adjusting the lever I at the proper point, it being understood that the bars $l\ l$, between which the sickles work, are attached to the curved bar H.

By means of the improvements herein described the machine is put under the perfect control of the driver. The machine also is rendered simple in construction, may be used either as a reaper or mower, and may be constructed at a moderate expense.

Having thus described my invention, what I claim as new, and desire to secure by Letters Patent, is—

1. Operating the sickles $m\ m$ by means of the levers L L, attached to the bar H, the rods $n\ n$ and lever M, actuated by the cam O, the parts being combined and arranged relatively with each other substantially as described.

2. Attaching the sickles $m\ m$ to the adjustable bar H, arranged as shown, and used in connection with the lever I, whereby the sickles may be raised and lowered with facility.

3. Pivoting the oscillating lever M to the bar N, which is arranged as shown, so that the lever M may be thrown in and out of gear with the cam O.

4. The sliding plate F, placed on the frame A, and arranged, substantially as shown, so as to regulate or control the draft-pole, and consequently the position of the sickles, as occasion may require.

D. B. WAITE.

Witnesses:
MAURICE BROWN,
HIRAM P. RICHARDS.